United States Patent
Baic et al.

(10) Patent No.: US 8,113,551 B2
(45) Date of Patent: Feb. 14, 2012

(54) RADOME LATCH AND KEEPER

(75) Inventors: Zarko Baic, Sylmar, CA (US); Zeljko Baic, Sylmar, CA (US)

(73) Assignee: Avibank Manufacturing, Inc., North Hollywood, CA (US)

( * ) Notice: Subject to any disclaimer, the term of this patent is extended or adjusted under 35 U.S.C. 154(b) by 857 days.

(21) Appl. No.: 12/157,895

(22) Filed: Jun. 13, 2008

(65) Prior Publication Data

US 2009/0051170 A1 Feb. 26, 2009

Related U.S. Application Data

(60) Provisional application No. 60/934,595, filed on Jun. 13, 2007.

(51) Int. Cl.
*E05C 5/00* (2006.01)
*E05C 9/12* (2006.01)

(52) U.S. Cl. ........ 292/113; 292/109; 292/200; 292/210; 292/DIG. 31

(58) Field of Classification Search .................. 292/109, 292/110, 113, 114, 200, 210, DIG. 31
See application file for complete search history.

(56) References Cited

U.S. PATENT DOCUMENTS

| | | | | |
|---|---|---|---|---|
| 3,194,595 A * | 7/1965 | Wheeler et al. | ........... | 292/113 |
| 3,259,412 A * | 7/1966 | Wheeler | ........... | 292/113 |
| 4,116,479 A * | 9/1978 | Poe | ........... | 292/113 |
| 4,183,564 A * | 1/1980 | Poe | ........... | 292/113 |
| 4,478,446 A | 10/1984 | Duran | | |
| 4,520,364 A | 5/1985 | Perry | | |
| 4,530,529 A * | 7/1985 | Poe et al. | ........... | 292/113 |
| 4,691,952 A * | 9/1987 | Harmon | ........... | 292/341.18 |
| 4,759,574 A * | 7/1988 | James | ........... | 292/113 |
| 4,852,923 A | 8/1989 | Harmon et al. | | |
| 4,858,970 A * | 8/1989 | Tedesco et al. | ........... | 292/113 |
| 5,127,684 A * | 7/1992 | Klotz et al. | ........... | 292/113 |
| 5,129,990 A | 7/1992 | Binnie, Jr. et al. | | |
| 5,484,176 A * | 1/1996 | Sallwasser | ........... | 292/137 |
| 5,820,077 A | 10/1998 | Sutliff et al. | | |
| 6,279,971 B1 * | 8/2001 | Dessenberger, Jr. | ........... | 292/113 |
| 6,325,428 B1 * | 12/2001 | Do | ........... | 292/113 |
| 6,343,815 B1 * | 2/2002 | Poe | ........... | 292/113 |
| 7,066,501 B2 | 6/2006 | Meineke et al. | | |
| 2005/0082841 A1 * | 4/2005 | Amy | ........... | 292/109 |

* cited by examiner

*Primary Examiner* — Carlos Lugo
(74) *Attorney, Agent, or Firm* — James M. Duncan, Esq.; Klein, DeNatale, Goldner, et al.

(57) ABSTRACT

A latch and keeper combination is utilized for securing a radome to an aircraft fuselage. The keeper has a keeper housing and an eyebolt member which extends toward the latch from the keeper housing. The latch has a pivoting handle member pivotally attached to a latch housing. A hook member depends from the handle member. Once the hook member is generally placed about the eye bolt, depressing the handle member further causes the hook to rotate within the latch housing. As the handle member is completely depressed, the hook member fully engages the eye bolt, while at the same time members axially extend from the latch to engage the keeper which provides a resistance to shear between the latch and keeper. The apparatus may also have a safety which prevents the handle from fully closing until the eye bolt is fully engaged by the hook member, thereby providing visual confirmation that the latch has completely engaged the keeper.

16 Claims, 6 Drawing Sheets

RADOME LATCH AND KEEPER

CROSS-REFERENCE TO RELATED APPLICATION

U.S. Provisional Application No. 60/934,595 for this invention was filed on Jun. 13, 2007, for which application these inventors claim domestic priority.

BACKGROUND OF THE INVENTION

This invention generally relates to aircraft fuselage radomes and mechanisms for attaching the radome to the fuselage of the aircraft. This invention specifically relates to latch assemblies and keeper assemblies which are used for attaching a radome to an aircraft.

A radome is an enclosing structure mounted to the fuselage of an aircraft which may be used, among other things, to enclose and protect antennae or radar equipment on the aircraft. Because the radome is on the exterior of the aircraft, it is designed in accord with the desired aerodynamic properties of the aircraft. The radome must be constructed of materials which are compatible with the aerodynamic loads to which the radome will be subjected. Moreover, because the equipment protected by the radome must be accessed for maintenance and servicing, the radome must be relatively easy to detach for gaining access to the enclosed equipment. One type of device utilized for attaching a radome to the aircraft fuselage is a latch with a corresponding keeper. These devices must be aerodynamically designed and be capable of retaining the radome to the fuselage notwithstanding the substantial forces exerted on the radome during flight of the aircraft. However, for maintenance purposes, the mechanism should be relatively easy to manipulate, but have positive locking capability to prevent inadvertent release of the latch.

SUMMARY OF THE INVENTION

The present invention is directed to an attachment mechanism for attaching a radome to an aircraft fuselage. The attachment mechanism comprises a latch which may be attached on the radome and a keeper which may be attached to the bulkhead of the fuselage, or vice-versa. Multiple sets of latches and keepers are utilized for mounting the radome to the fuselage. For example, for a Boeing 787, the radome has four latch and keeper sets on the right side and another four latch and keeper sets on the left side. The disclosed latch and keeper sets are installed so as to be flush with the airplane skin when the latch is in a closed position so as to limit any negative impact on the aerodynamics of the aircraft.

An embodiment of the disclosed apparatus comprises a latch comprising a latch assembly having a hook member depending from and pivotally attached to a handle member. The latch assembly pivotally attaches within a latch housing. The latch housing flush mounts within the wall of the radome. The latch assembly manually engages and disengages from the keeper assembly. The keeper assembly may comprise an eyebolt member, or other appropriate engagement structure, the eyebolt member having an axially extending shaft, a housing which flush mounts to the fuselage, the housing having an aperture for receiving the axially extending shaft, an end plate, and an adjusting nut for engaging the axially extending shaft.

The hook member of the latch assembly manually engages an eyebolt of the keeper assembly thereby securing the radome to the fuselage of the aircraft once all latch and keeper assemblies have been engaged. Once the hook member is generally placed about the eyebolt, depressing the handle member toward the latch housing causes the hook to rotate within the housing, thereby drawing the latch assembly into contact with the keeper assembly. When fully depressed, the top surface of the handle member is flush with the top surface of the latch housing.

The latch assembly further comprises means for resisting shear between the latch and the keeper. One such means may comprise one or more bumper assemblies which extend axially from the latch housing. A bumper assembly may comprise a bumper which is slideably mounted on a shear pin, the shear pin attached to a link arm, and the link arm attached to a pin transversely mounted within the latch housing. The bumper comes into engaging contact with the housing of the keeper assembly as the handle member is depressed into the latch housing and the keeper and latch are drawn together. As the shear pin is urged axially against its bumper, the shear pin compresses a coiled spring axially disposed on the shear pin, an end of the spring abutting a shoulder member of the shear pin.

The latch assembly may further comprise a release trigger which is pivotally attached within the handle member. The release trigger prevents the inadvertent disengagement of the eyebolt by the hook member. The handle member cannot be raised from the latch housing until the release trigger set within the handle member is depressed as the handle member is raised. The latch assembly may further comprise means for confirming that the keeper has been fully engaged by the latch. Such means may comprise a mechanism which prevents the handle member from fully closing until the keeper has been fully engaged.

DETAILED DESCRIPTION OF THE EMBODIMENTS

Figure 1A:
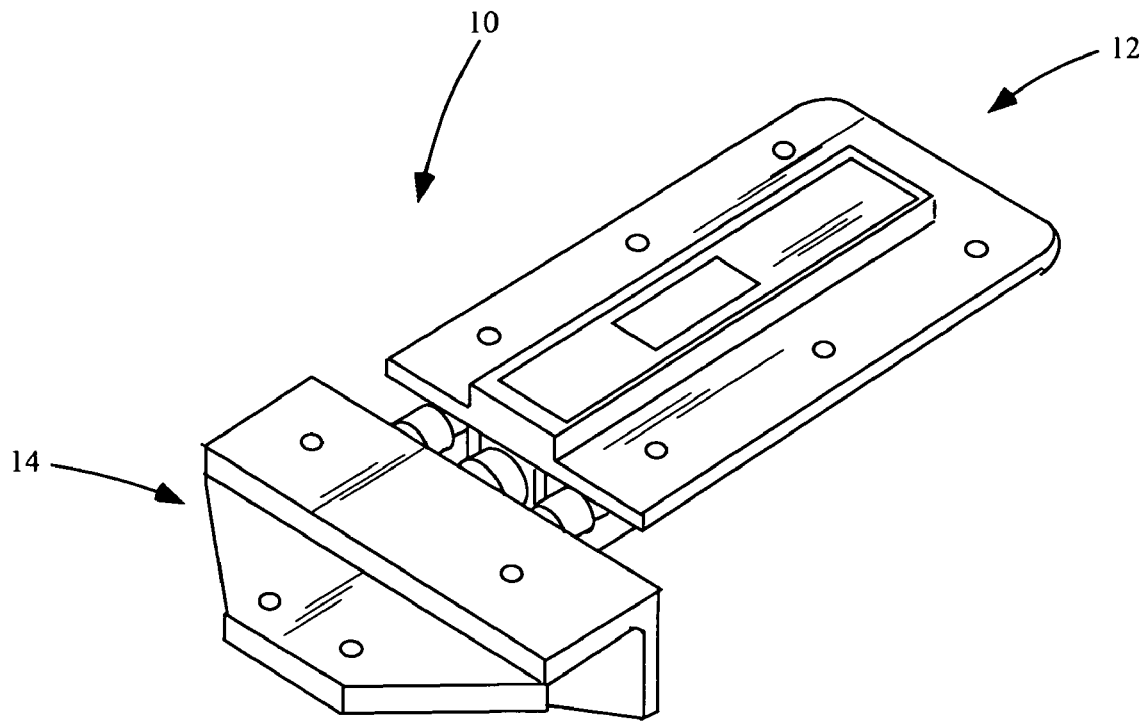
FIG. 1A is an isometric view of an embodiment of the disclosed latch and keeper.
Figure 1B:
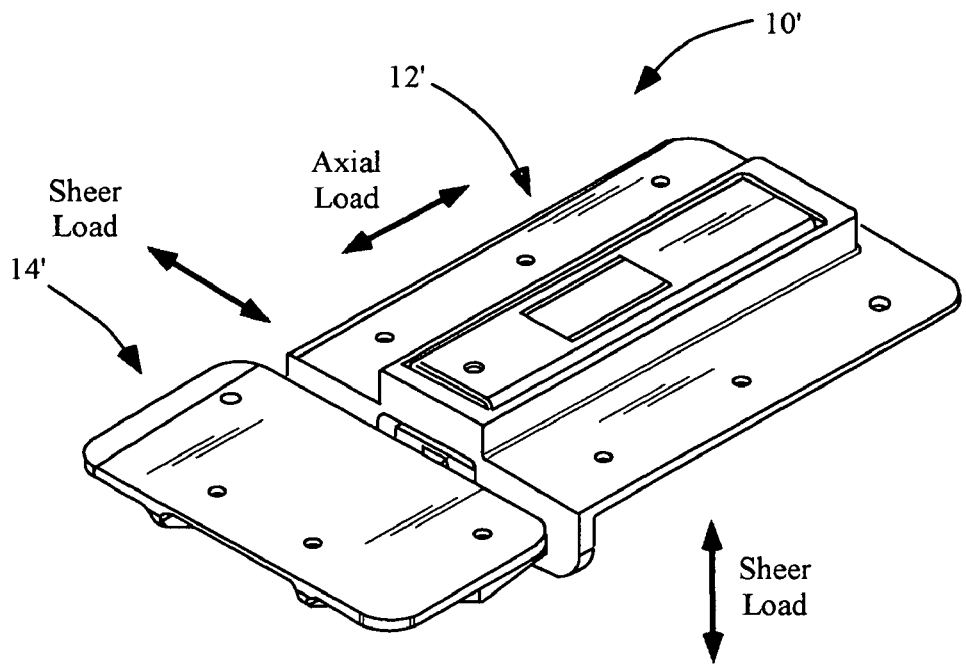
FIG. 1B is an isometric view of a second embodiment of the disclosed latch and keeper, also indicating the shear and axial loads to which the latch and keeper are subjected.
Figure 2:
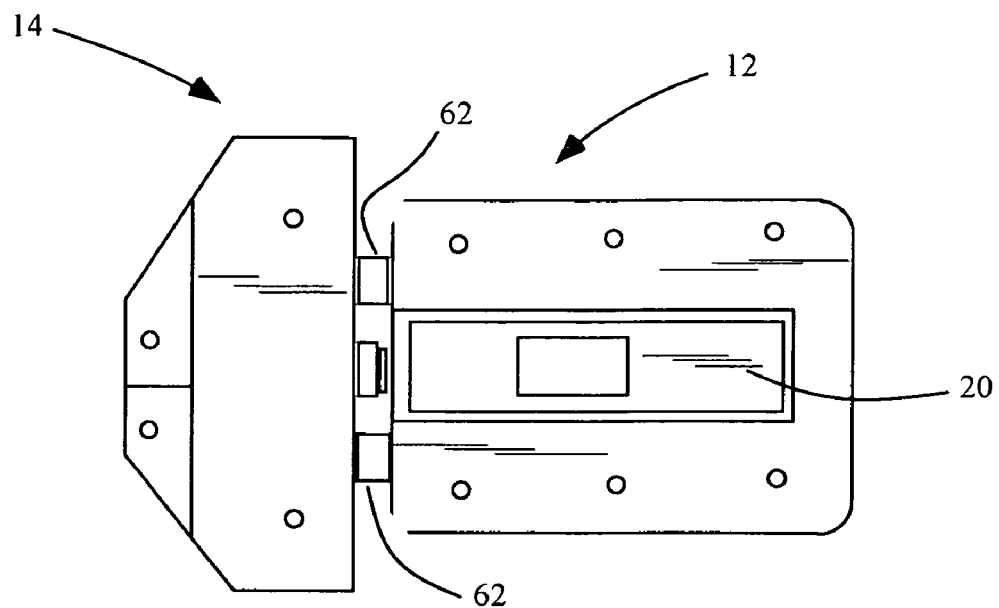
FIG. 2 is a top view of an embodiment of the disclosed latch and keeper with the keeper engaged by the latch (the radome and fuselage are not shown).
Figure 3:
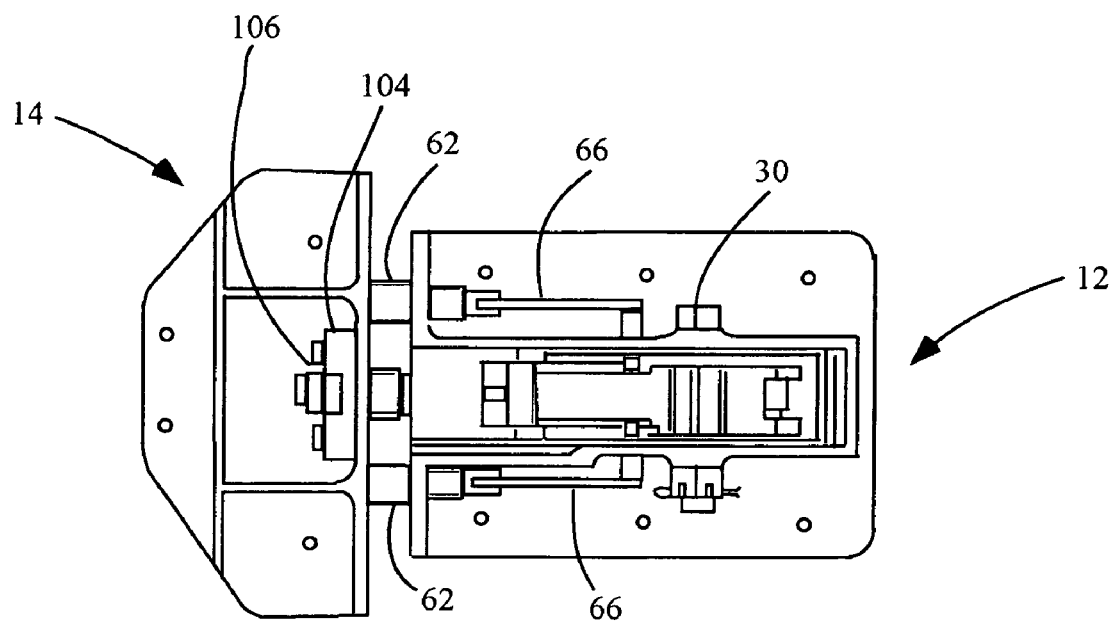
FIG. 3 is bottom view of the embodiment of the disclosed latch and keeper shown in FIG. 1 with the keeper engaged by the latch.

Referring now to the drawings, FIG. 1 shows an embodiment 10 of the disclosed latch and keeper which are utilized for attaching a radome to an aircraft fuselage, where the latch may be mounted to the radome and the keeper may be mounted to the fuselage. The device generally comprises latch 12 and keeper 14. Latch 12 comprises a latch assembly 16 which is pivotally attached to latch housing 18, where the latch housing defines a longitudinal axis $A_1$. For purposes of this description, the term "forward" used in connection with latch 12 is referring to the end of latch 12 adjacent to keeper 14 and the term "rearward" refers to the end of the latch furthest from the keeper.

Figure 6:
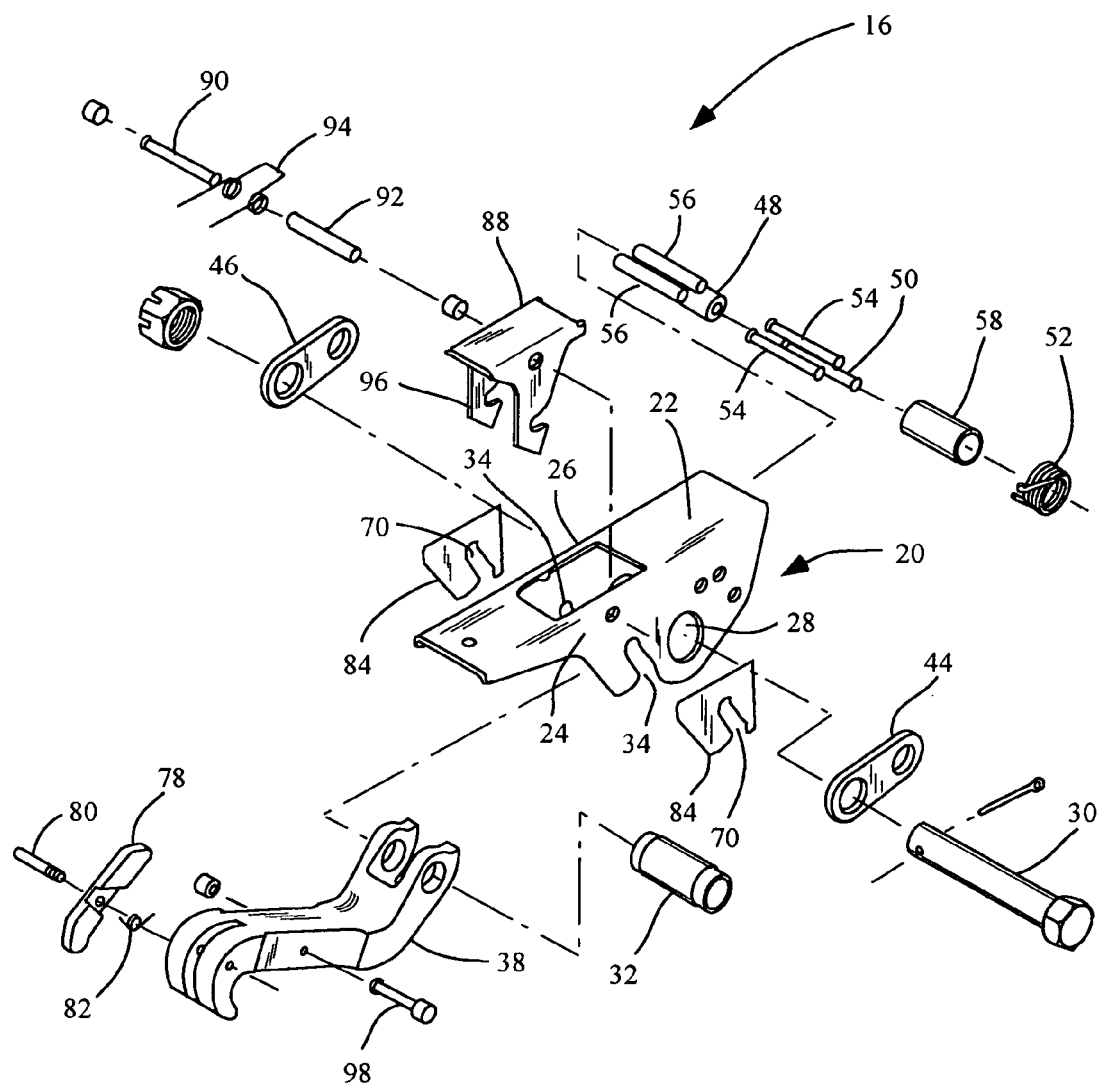
FIG. 6 is an exploded view of a latch assembly for an embodiment of the disclosed latch.

A detailed view of an embodiment of a latch assembly 16 is shown in FIG. 6. The latch assembly 16 comprises a handle member 20 which may comprise a rectangular top 22 and sides 24, 26. Handle member 20 comprises a plurality of apertures which are utilized to retain the various components of the latch assembly 16 and to mount the latch assembly to latch housing 18. Handle member 20 comprises bolt aperture 28 through which bolt 30 is disposed and retained within bushing 32. Handle member 20 further comprises matching slots 34 in sides 24, 26. As discussed further below, pin 36 is disposed transversely between matching slots 34. Hook member 38 is pivotally affixed to link 44. Link 44 is affixed to handle member 20 by bolt 30, which also retains latch assembly 16 within latch housing 18.

Figure 5:
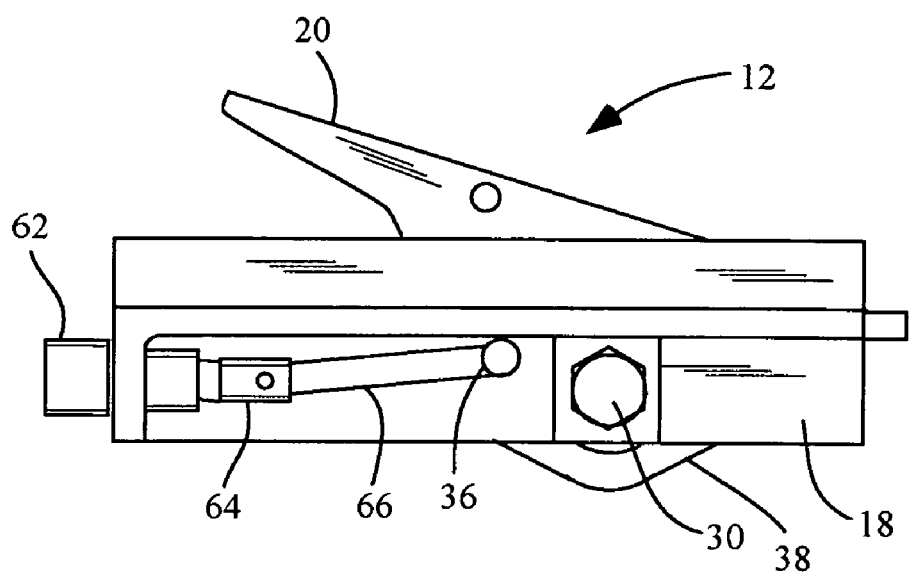
FIG. 5 is a side view of an embodiment of the disclosed latch shown in the open position, disengaged from the keeper.

FIG. 5 shows the latch 12 disengaged from keeper 14. As shown in FIG. 5, when the latch 12 is disengaged, handle member 20 is in a raised position at the forward end of latch 12. It is to be appreciated that latch 12 may be configured such that the orientation of handle member 20 is reversed such that it is raised from the rearward end of latch 12. Handle member 20, which pivots about bolt 30, is biased in the open position by spring 52, which is linked to bolt 30 by links 44 and 46 which are attached at their opposite ends to bushing 48, which is retained within latch housing 18 by rivet 50. For ease of illustration, FIG. 6 shows links 44 and 46 on the exterior of handle member 22, however, the latch assembly 16 is assembled with links 44 and 46 on the interior of handle member 20. Bushing 48 is set within larger bushing 58. Rivets 54 are disposed within bushings 56, and are utilized to provide a stop for spring 52 and provide additional stiffening to handle member 20.

Figure 4:
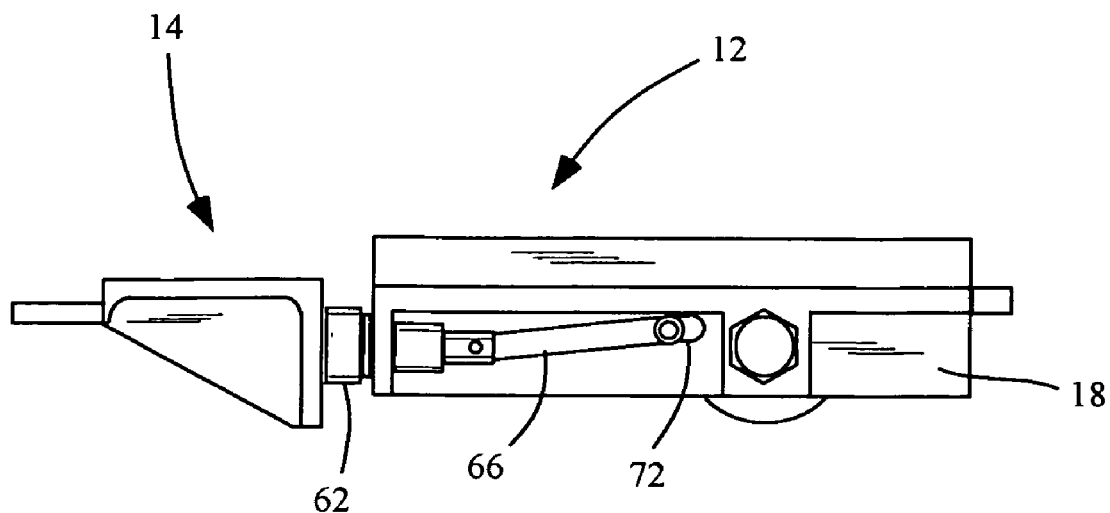
FIG. 4 is side view of the embodiment of the disclosed latch and keeper shown in FIG. 1 with the keeper engaged by the latch.
Figure 7:
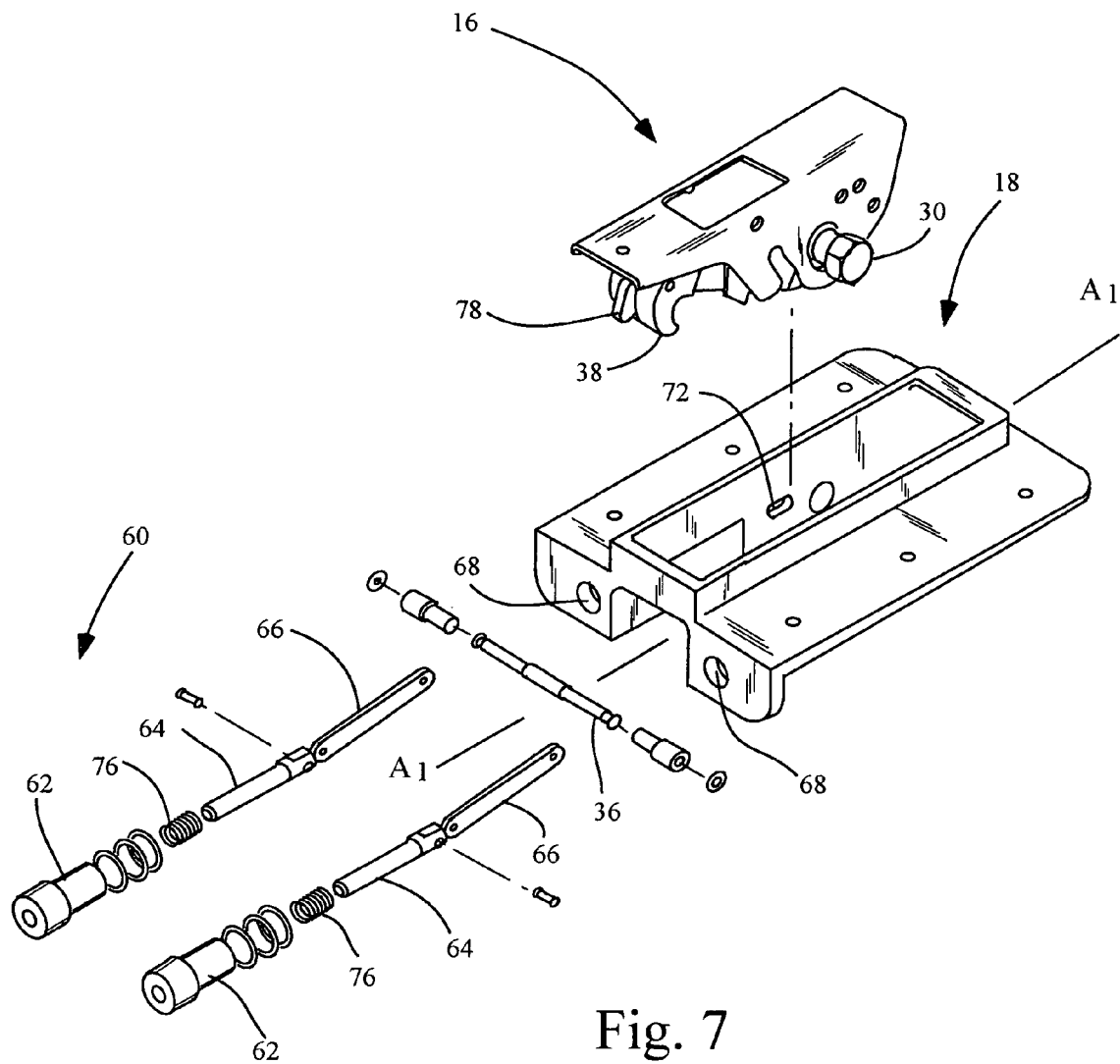
FIG. 7 shows the assembled latch assembly of FIG. 6, and an exploded view of the other components of an embodiment of the latch.

As best shown in FIG. 7, latch 12 further comprises selectively actuated means for resisting shear between the latch 12 and the keeper 14, such that the means for resisting shear is activated by operation of the latch and is fully engaged when the handle member 20 is fully depressed, that is when the handle member is flush with the latch housing 18. Such means may comprise bumper assemblies 60. The bumper assemblies 60 may comprise bumpers 62. Each bumper 62 is attached to a shear pin 64, which are pivotally attached to a link arm 66. Each link arm 66 enters latch housing 18 through openings 68. The ends of the links arms 66 are attached to pin 36 which is disposed transversely between slots 34 of handle member 20. As shown in FIG. 6, handle member 20 may comprise doublers 84 which are attached to the inside of handle member 20, by spot welding or other means known in the art. As shown in FIG. 6, the slots 70 in the doublers 84 are aligned with slots 34, such that pin 36 extends transversely through all of the slots. Doublers 84 provide reinforcement and stiffening to handle member 20. As shown in FIGS. 4 and 5, links arms 66 are on the outside of latch housing 18. Latch housing 18 comprises slots 72 on either side which allow pin 36 to move forward.

As handle member 20 is pushed downwardly toward latch housing 18, pin 36 is urged forward by slots 34 of the handle member and slots 70 of the doublers 84. When it is desired to secure a radome to the fuselage, the handle member 20 of each latch 12 is pushed downwardly toward latch housing 18, thereby causing hook member 38 to engage rivet 40 which is retained within eyebolt 42. Once hook member 38 has engaged rivet 40, which is referred to herein as the first position, further pushing of handle member 20 toward latch housing 18 causes the hook member 38 to rotate within latch housing 18, and simultaneously causes pin 36 to be moved forward with respect to latch housing 18 thereby causing the bumpers 62 to engage the face 86 of keeper housing 74 and compressing the springs 76.

Once handle member 20 is fully depressed against the latch housing 18, the latch 12 should be in complete engagement with the keeper 14, referred to herein as the second position. The device may comprise visual confirmation means which provide confirmation when the latch 12 has fully engaged keeper 14. Such means may comprise hook member 38 being equipped with safety 78 which is retained within hook member 38 with rivet 80 and biased forward by spring 82. When hook member 38 has fully engaged rivet 40 of the keeper 14, the rear portion of safety 78 is pivoted upwardly, causing the front portion of safety 78 to recede into hook member 38. If hook member 38 fails to engage rivet 40, safety 78 remains protruding from the front of the hook member (as shown in FIG. 7), and thereby prevents handle member 20 from reaching the second position. The raised handle member 20 therefore provides a positive visual indication that the latch 12 is not fully engaged with the keeper 14.

Latch 12 may further comprise a release trigger 88 which prevents the latch 12 from disengaging with keeper 14 until the release trigger is activated. As shown in FIG. 6, release trigger 88 may pivot on pin 90 which is disposed within bushing 92. Release trigger 88 is biased in the locked position by spring 94. Release trigger 88 may further comprise engagement arms 96 which engage pin 98 when the handle member 20 is in the second position. When the handle member 20 is in the second position (i.e., the latch 12 is in complete engagement with keeper 14), handle member 20 cannot be pulled open until release trigger 88 is depressed, releasing engagement arms 96 from pin 98.

Figure 8:
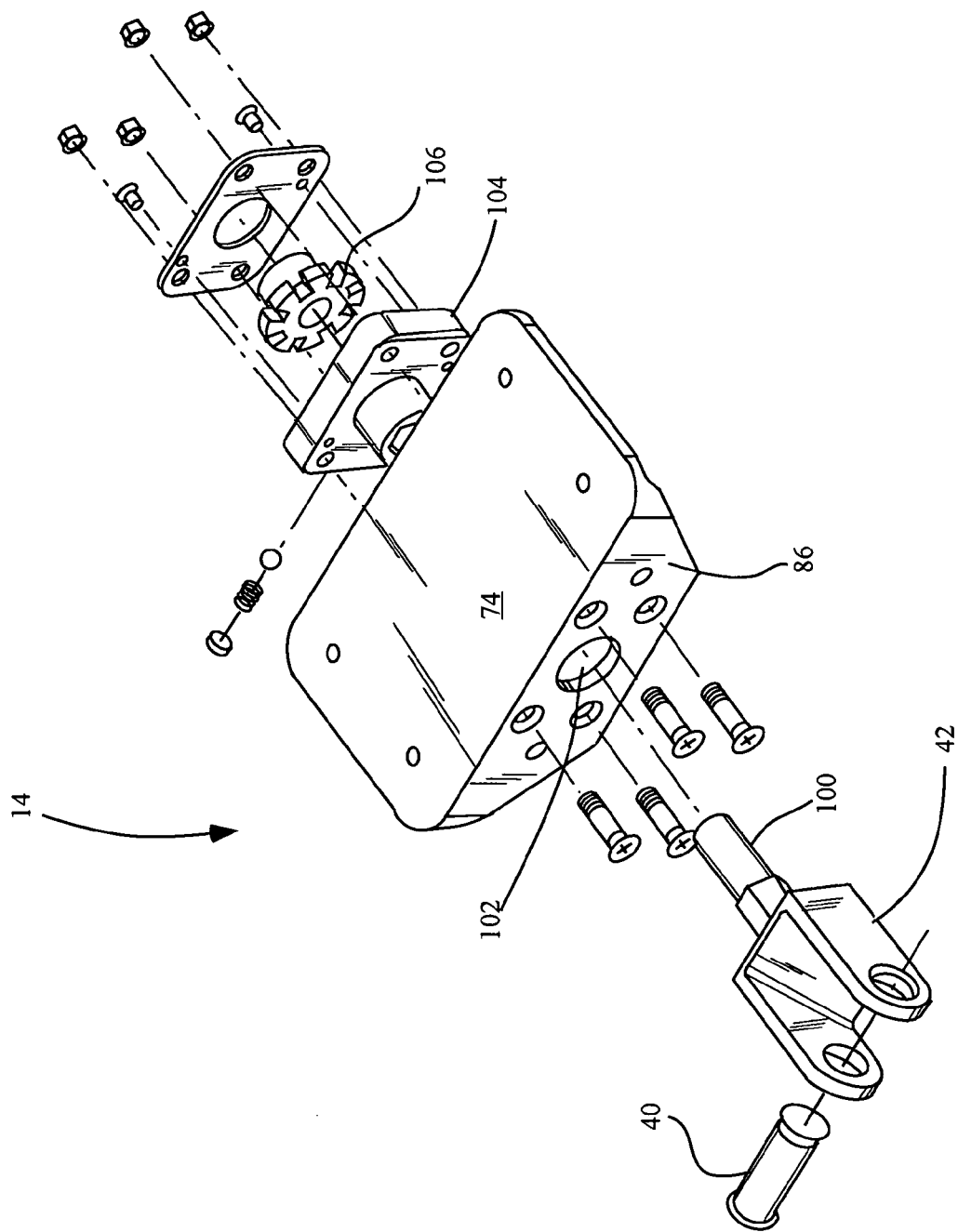
FIG. 8 is an exploded view of an embodiment of the keeper assembly

FIG. 8 shows an exploded view of an embodiment of keeper 14. Keeper 14 comprises eyebolt 42 attached to axially extending shaft 100. Shaft 100 extends through aperture 102 of keeper housing 74 and through base plate 104 and secured by adjusting nut 106. In this embodiment, the position of eyebolt 42 may be adjusted by manipulation of adjusting nut 106.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. An apparatus for connecting a radome to an aircraft fuselage comprising:
   a keeper comprising a keeper housing and an eyebolt member having an axially extending shaft attached to the keeper housing; and
   a latch comprising a latch assembly pivotally attached to a latch housing wherein the latch housing defines a longitudinal axis, said latch assembly comprising a handle member and a hook member pivotally affixed to the handle member, the latch further comprising a bumper extending axially from the latch housing, wherein, as the handle member is pivoted from a first position to a second position with respect to the latch housing, the bumper is urged forward from the latch housing into engaging contact with the keeper and the hook member engages the keeper, wherein the bumper is slideably attached to a shear pin, the shear pin attached to a link arm, and the link arm attached to a pin transversely mounted within the latch housing, wherein each end of the pin is disposed within a slot on either side of the latch housing, and the pin is urged forward when the handle member is pivoted to the second position.

2. The latch and keeper of claim 1 wherein the handle member is in the second position when the hook member engages the keeper.

3. The latch and keeper of claim 2 further comprising visual indication means which confirms the hook member has engaged the keeper.

4. The latch and keeper of claim 3 wherein the visual indication means comprises means for preventing the handle member from reaching the second position if the hook member has not engaged the keeper.

5. The latch and keeper of claim 1 further comprising a release trigger which prevents the latch from disengaging with the keeper until the release trigger is activated.

6. The latch and keeper of claim 5 wherein the release trigger comprises engagement arms which are biased to engage the hook member when the handle member is in the second position.

7. The latch and keeper of claim 1 wherein the keeper comprises adjustment means for changing the distance between the eyebolt member and the keeper housing.

8. The latch and keeper of claim 1 wherein the keeper housing comprises an end plate for receiving the axially extending shaft.

9. An apparatus for connecting a radome to an aircraft fuselage comprising:
a keeper comprising a keeper housing and an eyebolt member having an axially extending shaft attached to the keeper housing; and
a latch comprising a latch assembly pivotally attached to a latch housing, the latch housing defining a longitudinal axis, said latch assembly comprising a handle member and a hook member pivotally affixed to the handle member, the latch further comprising means for resisting shear between the latch and the keeper;
wherein, as the handle member is pivoted from a first position to a second position wherein the handle member is flush with the latch housing, the hook member engages the keeper and the means for resisting shear between the latch and the keeper is actuated, wherein the means for resisting shear between the keeper and the latch comprises a bumper slideably attached to a shear pin, the shear pin attached to a link arm, and the link arm attached to a pin transversely mounted within the latch housing, wherein each end of the pin is disposed within a slot on either side of the latch housing, and the pin is urged forward when the handle member is pivoted to the second position.

10. The latch and keeper of claim 9 wherein the handle member is in the second position when the hook member engages the keeper.

11. The latch and keeper of claim 10 further comprising visual indication means which confirms the hook member has engaged the keeper.

12. The latch and keeper of claim 11 wherein the visual indication means comprises means for preventing the handle member from reaching the second position if the hook member has not engaged the keeper.

13. The latch and keeper of claim 9 further comprising a release trigger which prevents the latch from disengaging with the keeper until the release trigger is activated.

14. The latch and keeper of claim 13 wherein the release trigger comprises engagement arms which are biased to engage the hook member when the handle member is in the second position.

15. The latch and keeper of claim 9 wherein the keeper comprises adjustment means for changing the distance between the eyebolt member and the keeper housing.

16. The latch and keeper of claim 9 wherein the keeper housing comprises an end plate for receiving the axially extending shaft.

\* \* \* \* \*